(12) United States Patent
Weidmann et al.

(10) Patent No.: US 11,028,213 B2
(45) Date of Patent: Jun. 8, 2021

(54) PRODUCTION OF DISPERSANTS BY NITROXIDE-MEDIATED SOLUTION POLYMERIZATION

(71) Applicant: SIKA TECHNOLOGY AG, Baar (CH)

(72) Inventors: Jürg Weidmann, Frauenfeld (CH); Fabia Ulber, Tagelswangen (CH); Jörg Zimmermann, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/461,138

(22) PCT Filed: Nov. 21, 2017

(86) PCT No.: PCT/EP2017/079963
§ 371 (c)(1),
(2) Date: May 15, 2019

(87) PCT Pub. No.: WO2018/095926
PCT Pub. Date: May 31, 2018

(65) Prior Publication Data
US 2020/0071444 A1    Mar. 5, 2020

(30) Foreign Application Priority Data

Nov. 22, 2016 (EP) .................................. 16200072

(51) Int. Cl.
| | | |
|---|---|---|
| *C08F 290/06* | (2006.01) | |
| *C08F 293/00* | (2006.01) | |
| *C04B 24/26* | (2006.01) | |
| *C04B 103/00* | (2006.01) | |
| *C04B 103/40* | (2006.01) | |

(52) U.S. Cl.
CPC ...... *C08F 290/062* (2013.01); *C04B 24/2647* (2013.01); *C04B 24/2658* (2013.01); *C08F 293/005* (2013.01); *C04B 2103/0045* (2013.01); *C04B 2103/408* (2013.01); *C08F 2438/02* (2013.01)

(58) Field of Classification Search
CPC .............. C08F 290/062; C08F 293/005; C08F 2438/02; C04B 24/2647; C04B 24/2658; C04B 2103/0045; C04B 2103/408; C04B 2438/02
USPC ............................................................ 524/5
See application file for complete search history.

(56) References Cited

U.S. PATENT DOCUMENTS 7,635,740 B2 * 12/2009 Charleux .................. C08F 2/24
524/707
2006/0111479 A1    5/2006 Hidalgo et al.

FOREIGN PATENT DOCUMENTS

| EP | 1138697 A1 | 10/2001 |
|---|---|---|
| EP | 15 186 756 | 8/2018 |
| WO | 2008/079677 A2 | 7/2008 |
| WO | 2015/144886 A1 | 10/2015 |

OTHER PUBLICATIONS

Ch. 3, Section 1.1 "pH—General Description", Basic Laboratory Procedures for the Operator-Analyst, WEF Special Publication, 5th Ed., Water Environment Federation, p. 88. (Year: 2012).*
Mar. 5, 2018 International Search Report issued in International Application No. PCT/EP2017/079963.
Tsarevsky et al, "Fundamentals of Controlled/Living Radical Polymerization", The Royal Society of Chemistry, RSC Polymer Chemistry Series No. 4, pp. 1-36, 2013.
May 28, 2019 International Preliminary Report on Patentability issued in International Patent Application No. PCT/EP2017/079963.

* cited by examiner

*Primary Examiner* — Josephine L Chang
(74) *Attorney, Agent, or Firm* — Oliff PLC

(57) ABSTRACT

The present invention relates to processes for preparing a copolymer, especially a dispersant for solid particles, in particular a dispersant for mineral binder compositions, wherein ionizable monomers m1 and side chain-bearing monomers m2 are polymerized by nitroxide-mediated solution polymerization to give a copolymer, wherein the polymerization is conducted in the presence of an agent comprising a carboxyl group-bearing and phosphated alkoxy amine.

14 Claims, No Drawings

PRODUCTION OF DISPERSANTS BY NITROXIDE-MEDIATED SOLUTION POLYMERIZATION

TECHNICAL FIELD

The invention relates to a process for preparing a dispersant for solid particles, in particular a dispersant for mineral binder compositions, wherein ionizable monomers m1 and side chain-bearing monomers m2 are polymerized to form a copolymer, and to copolymers obtainable correspondingly. The invention further relates to the use of copolymers and to mineral binder compositions and shaped bodies which comprise copolymers and are formed therefrom.

PRIOR ART

Dispersants or flowing agents are used especially in the construction industry as plasticizers or water-reducing agents for mineral binder compositions, for example concrete, mortar, cements, gypsums and lime. The dispersants are generally organic polymers which are added to the mixing water or admixed with the binder compositions in solid form. In this way, it is advantageously possible to alter both the consistency of the binder composition during processing and to alter the properties in the hardened state.

Known particularly effective dispersants are, for example, comb polymers based on polycarboxylate (PCE). Copolymers of this kind have a polymer backbone and side chains bonded thereto. Corresponding polymers are described, for example, in EP 1 138 697 A1 (Sika AG).

In order to prepare comb polymers with defined structure, a particular option is preparation via free-radical polymerization reactions. In this case, different and reactive monomers (side chain monomers and anchor group monomers) are reacted in a polymerization reaction with the aid of an initiator and a chain transfer agent. In this way, it is possible, for example, to prepare copolymers having block and/or gradient structures in a simple manner, which enables controlled adjustment to different end uses. A corresponding process is described, for example, in patent application No. 15 186 756 (Sika Technology AG).

According to the polymerization technique used, in the case of free-radical polymerization reactions, however, it is necessary under some circumstances to use environmentally harmful chemicals (Cu salts, halides, bipyridines) (frequently used in RAFT or atom transfer radical polymerizations), or polymerization aids that are relatively costly or difficult to obtain are required (for example in the case of ATPR or reversible addition-fragmentation chain transfer polymerization).

There is therefore still a need for improved preparation processes and dispersants obtainable therefrom that do not have the disadvantages mentioned.

SUMMARY OF THE INVENTION

It is therefore an object of the invention to overcome the aforementioned disadvantages. More particularly, improved processes and dispersants are to be provided, especially for solid particles and in particular for mineral binder compositions. The processes are to enable preparation of the dispersants with maximum flexibility and in a controlled manner, so as to enable a controlled adjustment to different fields of use or end uses. At the same time, the production processes should as far as possible be performable without environmentally hazardous or costly substances, but nevertheless permit very efficient preparation of dispersants. The dispersants obtainable in this way are in particular to enable effective plasticization and good working of mineral binder compositions. In particular, the effect of the dispersant is to be maintained over a maximum period of time.

It has been found that, surprisingly, this object can be achieved by the features of independent claim 1.

The core of the invention is accordingly a process for preparing a copolymer, especially a dispersant for solid particles, in particular a dispersant for mineral binder compositions, wherein ionizable monomers m1 and side chain-bearing monomers m2 are polymerized by nitroxide-mediated solution polymerization to give a copolymer, wherein the polymerization is conducted in the presence of an agent comprising a carboxyl-bearing phosphated alkoxy amine.

As has been shown, it is possible by nitroxide-mediated solution polymerization using an agent comprising a carboxyl-bearing phosphated alkoxy amine to effectively calculate, modify and/or control the polymer structure and the sequence of the polymer units. In this way, it is possible, for example, to prepare copolymers having block and/or gradient structures in a simple manner. In addition, the result is copolymers having a relatively narrow molecular weight distribution or polydispersity. The preparation process of the invention permits preparation directly in an aqueous solution without needing to add significant amounts of environmentally problematic substances. Since it is a solution polymerization that is conducted in accordance with the invention, it is possible to largely dispense with emulsifiers or stabilizers. Moreover, it has been found that the agents used in accordance with the invention are obtainable relatively inexpensively and in sufficient amounts.

Dispersants and copolymers can thus be prepared in an inexpensive and environmentally friendly manner in an efficient process in a wide variety of different modifications in a reliable and flexible manner.

By comparison with known dispersants, dispersants prepared in accordance with the invention have very good plasticizing effects in mineral binder compositions. This effect is additionally maintained for a comparatively long period of time.

Even though the preparation of polymers by NMP methodology is known in other contexts, it comes as a surprise that it is also possible in this way to prepare sterically demanding polymers suitable as dispersants for solid particles and especially for mineral binder compositions with use of the relatively inexpensive agent of the invention in a solution polymerization process.

Further aspects of the invention are the subject of further independent claims. Particularly preferred embodiments of the invention are the subject of the dependent claims.

Ways of Executing the Invention

A first aspect of the present invention relates to a process for preparing a copolymer, especially a dispersant for solid particles, in particular a dispersant for mineral binder compositions, wherein ionizable monomers m1 and side chain-bearing monomers m2 are polymerized by nitroxide-mediated solution polymerization to give a copolymer, wherein the polymerization is conducted in the presence of an agent comprising a carboxyl-bearing phosphated alkoxy amine.

A further aspect of the present invention relates to a copolymer obtainable by the process of the invention.

The structure of the copolymers can be analyzed and determined, for example, by nuclear spin resonance spectroscopy (NMR spectroscopy). By $^1$H and $^{13}$C NMR spectroscopy in particular, it is possible in a manner known per se to determine the sequence of the monomer units in the copolymer on the basis of neighboring group effects in the copolymer and using statistical evaluations.

The terms "ionizable monomers" and "ionizable monomer units" especially mean monomers or polymerized monomers that are in anionic or negatively charged form at a pH>10, especially at a pH>12. These are especially H donor groups or acid groups. The ionizable groups are more preferably acid groups, for example carboxylic acid, sulfonic acid, phosphoric acid and/or phosphonic acid groups. Preference is given to carboxylic acid groups. The acid groups may also take the form of anions in deprotonated form or of a salt with a counterion or cation.

Preparation Process of the Invention

In the present context, the polymerization is effected by nitroxide-mediated solution polymerization.

Nitroxide-mediated polymerization (NMP) is known per se to the person skilled in the art in other contexts and is a variant of "living free-radical polymerization" or "controlled free-radical polymerization".

A free-radical polymerization can basically be divided into three steps: initiation, growth and termination.

"Living free-radical polymerization" or "controlled free-radical polymerization" comprehends chain growth processes in which essentially no chain termination reactions (transfer and termination) take place. Living free-radical polymerization thus proceeds essentially in the absence of irreversible transfer or termination reactions. These criteria can be fulfilled, for example, when the polymerization initiator is already used up at a very early stage during the polymerization and there has been exchange between species of different reactivity that proceeds at least as rapidly as the chain propagation itself. The number of active chain ends especially remains essentially constant during the polymerization. This enables essentially simultaneous growth of the chains that continues over the entire polymerization process. This correspondingly results in a narrow molecular weight distribution or polydispersity.

In other words, controlled free-radical polymerization or living free-radical polymerization is particularly notable for reversible or even absent termination or transfer reactions. After the initiation, the active sites are accordingly conserved over the entire reaction. All polymer chains are formed (initiated) simultaneously and grow continuously over the entire time. The free-radical functionality of the active site is ideally conserved even after complete conversion of the monomers to be polymerized. This exceptional property of the controlled polymerizations enables preparation of well-defined structures such as gradient or block copolymers through sequential addition of different monomers.

By contrast, in conventional free-radical polymerization, all three steps (initiation, growth and termination) proceed in parallel. The lifetime of each of the active, growing chains is very short and the monomer concentration during the chain growth of a chain remains essentially constant. The polymer chains thus formed do not have any active sites suitable for the addition of further monomers. Thus, this mechanism does not permit any control over the structure of the polymers. The preparation of gradient or block structures by means of conventional free-radical polymerization is therefore typically not possible (see, for example, "Polymere: Synthese, Synthese and Eigenschaften" [Polymers: Synthesis, Synthesis and Properties]; authors: Koltzenburg, Maskos, Nuyken; Verlag: Springer Spektrum; ISBN: 97-3-642-34772-6 and "Fundamentals of Controlled/living Radical Polymerization"; publisher: Royal Society of Chemistry; editors: Tsarevsky, Sumerlin; ISBN: 978-1-84973-425-7).

Thus, there is a clear distinction of "living free-radical polymerization" from conventional "free-radical polymerization" or free polymerization conducted in a non-living or non-controlled manner.

In nitroxide-mediated polymerization (NMP), nitroxides react reversibly with the active chain end to form what is called a dormant species. The equilibrium between active and inactive chain ends is strongly to the side of the dormant species, which means that the concentration of active species is very low. The probability of two active chains meeting and terminating is thus minimized. An example of a known NMP agent is 2,2,6,6-tetramethylpiperidine N-oxide (TEMPO).

According to the invention, a nitroxide-mediated polymerization is conducted in the form of a nitroxide-mediated solution polymerization. This means that all monomers and the copolymers formed are dissolved in the solvent or the reaction solution during the nitroxide-mediated polymerization. In particular, there are therefore no disperse phases, emulsions and/or suspensions during the polymerization reaction. There is preferably no addition of stabilizers, phase-stabilizing agents and/or emulsifiers.

The side chain-bearing monomers m2 especially include polyalkylene oxide side chains, preferably polyethylene oxide and/or polypropylene oxide side chains.

The ionizable monomers m1 preferably include acid groups, especially carboxylic acid, sulfonic acid, phosphoric acid and/or phosphonic acid groups.

More particularly, the ionizable monomers m1 have a structure of the formula I:

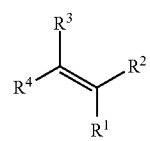

(I)

The side chain-bearing monomers m2 preferably have a structure of the formula II:

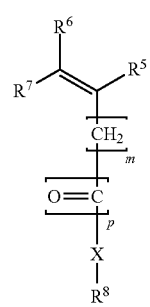

where $R^1$, in each case independently, is —COOM, —SO$_2$—OM, —O—PO(OM)$_2$ and/or —PO(OM)$_2$, $R^2$, $R^3$, $R^5$ and $R^6$, in each case independently, are H or an alkyl group having 1 to 5 carbon atoms, $R^4$ and $R^7$, in each case independently, are H, —COOM or an alkyl group having 1 to 5 carbon atoms, or where $R^1$ forms a ring together with $R^4$ to give —CO—O—CO—, M, independently of one another, represents H⁺, an alkali metal ion, an alkaline earth metal ion, a di- or trivalent metal ion, an ammonium ion or an organic ammonium group;

m=0, 1 or 2, p=0 or 1,

X, in each case independently, is —O— or —NH—, $R^8$ is a group of the formula -[AO]$_n$—$R^a$ where A=$C_2$- to $C_4$-alkylene, $R^a$ is H, a $C_1$- to $C_{20}$-alkyl group, -cycloalkyl group or -alkylaryl group, and n=2-250, especially 10-200.

On completion of polymerization, i.e. in polymerized form, the monomers m1 are each covalently bonded to further monomers via the carbon atom that bears the $R^1$ and $R^2$ groups and via the carbon atom that bears the $R^3$ and $R^4$ groups.

Correspondingly, on completion of polymerization, i.e. in polymerized form, the monomers m2 are each covalently bonded to further monomers via the carbon atom that bears the $R^5$ group and via the carbon atom that bears the $R^6$ and $R^7$ groups.

A molar ratio of the monomers m1 used to the monomers m2 used is advantageously in the range of 0.5-6, especially 0.7-4, preferably 0.9-3.8, further preferably 1.0-3.7 or 2-3.5.

In particular, $R^1$=COOM, $R^2$=H or $CH_3$, $R^3$=$R^4$=H. It is thus possible to prepare the copolymer on the basis of acrylic or methacrylic acid monomers, which is of interest from an economic point of view. Moreover, copolymers of this kind in the present context result in a particularly good dispersing effect.

Monomers with $R^1$=COOM, $R^2$=H, $R^3$=H and $R^4$=COOM may likewise be advantageous. Corresponding copolymers can be prepared on the basis of maleic acid monomers.

The X group in the ionizable monomers m2, advantageously in at least 75 mol %, particularly in at least 90 mol %, especially in at least 95 mol % or at least 99 mol % of all monomers m2, is —O— (=oxygen atom).

Advantageously, $R^5$=H or $CH_3$, $R^6$=$R^7$=H and X=—O—. It is thus possible to prepare the copolymers, for example, proceeding from (meth)acrylic esters, vinyl ethers, (meth)allyl ethers or isoprenol ethers.

In a particularly advantageous embodiment, $R^2$ and $R^5$ are each mixtures of 40-60 mol % of H and 40-60 mol % of —$CH_3$.

In a further advantageous embodiment, $R^1$=COOM, $R^2$=H, $R^5$=—$CH_3$ and $R^3$=$R_4$=$R_6$=$R_7$=H.

In another advantageous embodiment, $R^1$=COOM, $R^2$=$R^5$=H or —$CH_3$ and $R_3$=$R_4$=$R_6$=$R_7$=H.

More preferably, $R^5$=$CH_3$, $R^6$=$R^7$=H, X=—O—, p=1 and m=0. It is thus possible to prepare copolymers having methacrylic ester-based side chains, which has been found to be particularly advantageous in the present context.

Especially suitable monomers are those in which $R^1$=COOM; $R^2$ and $R^5$ are each independently H, —$CH_3$ or mixtures thereof; $R^3$ and $R^6$ are each independently H or —$CH_3$, preferably H; $R^4$ and $R^7$ are each independently H or —COOM, preferably H.

The $R^8$ radical in the side chain-bearing monomers m2, based on all the $R^8$ radicals in the monomers, consists of a polyethylene oxide especially to an extent of at least 50 mol %, especially at least 75 mol %, preferably at least 95 mol % or at least 99 mol %. A proportion of ethylene oxide units based on all the alkylene oxide units in the copolymer is especially more than 75 mol %, especially more than 90 mol %, preferably more than 95 mol % and specifically 100 mol %.

More particularly, $R^8$ has essentially no hydrophobic groups, especially no alkylene oxides having three or more carbon atoms. This especially means that a proportion of alkylene oxides having three or more carbon atoms based on all the alkylene oxides is less than 5 mol %, especially less than 2 mol %, preferably less than 1 mol % or less than 0.1 mol %. In particular, there are no alkylene oxides having three or more carbon atoms or the proportion thereof is 0 mol %.

$R^a$ is advantageously H and/or a methyl group. Particularly advantageously, A=$C_2$-alkylene and $R^a$ is H or a methyl group.

More particularly, the parameter n=10-150, especially n=15-100, preferably n=17-70, specifically n=19-45 or n=20-25. In particular, this achieves excellent dispersing effects within the preferred ranges specified.

More preferably, $R^1$=COOM; $R^2$ and $R^5$, independently of one another, are H, —$CH_3$ or mixtures thereof; $R^3$ and $R^6$, independently of one another, are H or —$CH_3$, preferably H; $R^4$ and $R^7$, independently of one another, are H or —COOM, preferably H; and where X in at least 75 mol %, particularly in at least 90 mol %, especially in at least 99 mol %, of all monomers m2 is —O—.

In a further advantageous embodiment, there is at least one further monomer ms present during the polymerization, which is polymerized, and this is especially a monomer of the formula III:

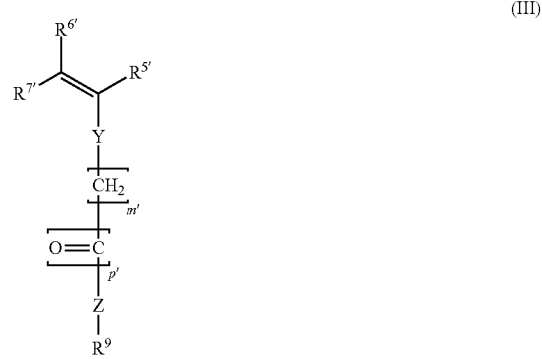

(III)

where $R^{5'}$, $R^{6'}$, $R^{7'}$, m' and p' are as defined above for $R^5$, $R^6$, $R^7$, m and p;

Y, in each case independently, is a chemical bond or —O—;

Z, in each case independently, is a chemical bond, —O— or —NH—;

$R^9$, in each case independently, is an alkyl group, cycloalkyl group, alkylaryl group, aryl group, hydroxyalkyl group or acetoxyalkyl group, each having 1-20 carbon atoms.

On completion of polymerization, i.e. in polymerized form, the monomers ms are each covalently bonded to further monomers via the carbon atom that bears the $R^{5'}$ group and via the carbon atom that bears the $R^{6'}$ and $R^{7'}$ groups.

Advantageous examples of further monomers ms are those where m'=0, p'=0, Z and Y represent a chemical bond and $R^9$ is an alkylaryl group having 6-10 carbon atoms.

Also suitable are especially further monomers ms in which m'=0, p'=1, Y is —O—, Z represents a chemical bond and $R^9$ is an alkyl group having 1-4 carbon atoms.

Further suitable are further monomers ms where m'=0, p'=1, Y is a chemical bond, Z is —O— and $R^9$ is an alkyl group and/or a hydroxyalkyl group having 1-6 carbon atoms.

When m'=0, p'=1, Y is a chemical bond, Z is —O—, it is preferable that $R^{5'}=R^{6'}=R^{7'}=H$. Thus, the further monomer ms may be based on an acrylate ester, which is particularly advantageous.

Particularly advantageously, the further monomer ms is vinyl acetate, styrene and/or hydroxyethyl (meth)acrylate, especially a hydroxyalkyl acrylate, very particularly a hydroxyethyl acrylate.

The solution polymerization of the invention is especially effected in a polar solvent, preferably in an aqueous solvent, more preferably in water. It is thus possible to dispense with environmentally problematic solvents. But the polymerization reactions nevertheless surprisingly proceed efficiently and in a controllable manner.

The polar solvent especially has a relative permittivity $\varepsilon_r > 5$, preferably >20, in particular >50, more preferably >70, where the permittivity is measured especially at a temperature of 25° C. a pressure of 1 bar. Relative permittivity $\varepsilon_r$ is also referred to as dielectric constant and is the ratio of permittivity c to vacuum permittivity $\varepsilon_0$. Solvents of this kind have been found to be particularly suitable in the present context.

Most preferably, the solvent comprises or consists of water and/or alcohol. Especially preferably, the solvent comprises or consists of water. Examples of suitable alcohols include methanol, ethanol, propanol, butanol, diethylene glycol and/or triethylene glycol.

Especially preferably, the solution polymerization is effected in a homogeneous phase. In other words, this means that there are preferably no disperse phases.

More preferably, the monomers to be polymerized, based on the total weight of monomers to be polymerized and solvent, have a proportion by weight of 25-75% by weight, especially 30-50% by weight, specifically 35-45% by weight.

In a particularly preferred embodiment, the agent is a carboxyl-bearing β-phosphorus nitroxide. It is especially a compound of the formula X:

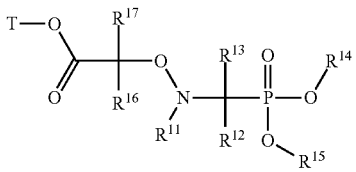

where $R^{11}$ is a linear or branched alkyl radical having 1-6, especially 2-4, preferably 3-4, carbon atoms;

$R^{12}$ and $R^{13}$ are each independently hydrogen or a linear or branched alkyl radical having 1-6, especially 2-4, preferably 3-4, carbon atoms;

$R^{14}$ and $R^{15}$ are each independently a linear or branched alkyl radical having 1-6, especially 2-4, preferably 2-3, carbon atoms;

$R^{16}$ and $R^{17}$ are each independently a linear or branched alkyl radical having 1-6, especially 1-4, preferably 1-2, carbon atoms;

T independently represents H⁺, an alkali metal ion, an alkaline earth metal ion, a di- or trivalent metal ion, an ammonium ion or an organic ammonium group.

Very especially preferred compounds are those in which:
i) $R^{11}$ and $R^{13}$ are each an alkyl group having 4 carbon atom, especially a tert-butyl group;
ii) $R^{12}$ is hydrogen;
iii) $R^{14}$ and $R^{15}$ are each an alkyl group having 2 carbon atoms, especially an ethyl group;
iv) $R^{16}$ and $R^{17}$ are each an alkyl group having 1 carbon atom, especially a methyl group; and
v) T is an alkali metal ion, especially an Li and/or Na ion.

In particular, the agent has a ratio of carboxyl groups to nitroxide groups of 2:1-1:2, preferably 1:1. More preferably, the agent has exactly one carboxyl group and exactly one nitroxide group.

Agents of this kind have been found to be optimal in order to assure an efficient preparation process and to obtain a defined structure of the copolymers or dispersants.

A molar ratio of agent to total molar amount of the monomers to be polymerized is especially 1:10-1:100, preferably 1:20-1:90, specifically 1:25-1:75, very particularly 1:30-1:70.

The nitroxide-mediated solution polymerization is advantageously conducted at a pH in the range of 3-13, especially 4-12 or 6-11, specifically 7-10, very particularly 7.5-10 or 7.5-8.5.

If a block copolymer is being prepared, blocks comprising side chain-bearing monomers m2, in an advantageous embodiment, are polymerized at a pH of 6-13, especially 7-12, more preferably 8-11. Blocks containing ionizable monomers m1 are polymerized preferably at a pH of 3-7, especially 4-6.

In the preparation of a copolymer with statistical (=random) monomer distribution and/or of a copolymer with gradient structure, the polymerization, in an advantageous embodiment, is effected in the range of 5-9, specifically 6-8 or 6.5-7.5.

In a further specific embodiment, the polymerization is effected at a pH greater than 7, especially at a pH of 7.5-13, especially 8-12, in particular 8-10, preferably 9-11. More particularly, this is independent of the structure of the copolymers.

The polymerization is preferably effected at a pH of less than 11, especially at a pH greater than 7 and less than 11, more preferably at a pH of 7.5-10, specifically at a pH of 7.5-9 or 7.5-8.5. More particularly, this is independent of the structure of the copolymers.

In a specifically preferred embodiment, the nitroxide-mediated solution polymerization is effected in the presence of a base, preferably in the presence of an alkali metal hydroxide and/or an alkali metal hydrogencarbonate, especially in the presence of sodium hydroxide and/or sodium hydrogencarbonate. This achieves a particularly homogeneous distribution of the agent in the reaction mixture, which is to the benefit of the efficiency of the process overall.

Moreover, the addition of the base can increase the pH of the reaction mixture, which has additionally been found to be advantageous in the present context.

More preferably, the agent is at least partly premixed together with the base. This is especially done at room temperature or 25° C.

The molar ratio of base to agent is especially 1:1-10:1, preferably 2:1-5:1.

Preferably, the at least partly premixed agent is then added to the monomers to be polymerized and any solvent. Preferably, the monomers to be polymerized and any solvent are already at that temperature at which the polymerization reaction is effected.

In particular, the nitroxide-mediated solution polymerization is effected at a temperature of 40-120° C., especially 60-110° C., preferably 70-100° C. Temperatures of this kind permit a rapid and efficiently controllable reaction of the monomers.

Alternatively, it is possible in principle to work in different temperature ranges.

In particular, a copolymer having a polydispersity (=weight-average molecular weight $M_w$/number-average molecular weight $M_n$) of the copolymer is <1.5, particularly in the range of 1.0-1.4, especially 1.1-1.3, is prepared.

A weight-average molecular weight $M_w$ of the overall copolymer is especially in the range of 10'000-150'000 g/mol, advantageously 12'000-80'000 g/mol, especially 12'000-50'000 g/mol. In the present context, molecular weights such as the weight-average molecular weight $M_w$ or the number-average molecular weight $M_n$ are determined by gel permeation chromatography (GPC) with polyethylene glycol (PEG) as standard. This technique is known per se to those skilled in the art.

More particularly, during the polymerization, a molar ratio of free ionizable monomers m1 to free side chain-bearing monomers m2 is at least temporarily altered.

Specifically, the alteration of the molar ratio includes stepwise and/or a continuous alteration. It is thus possible to form, in an efficiently controllable manner, a block structure and/or a concentration gradient or a gradient structure.

Optionally, during the polymerization, either a continuous change or a stepwise change in the molar ratio of the free ionizable monomers m1 to the free side chain-bearing monomers m2 is effected. This stepwise change is especially effected prior before the continuous change is conducted. In this way, for example, a copolymer comprise two or more sections having different structure is obtainable.

For formation of copolymers having block and/or gradient structures, the ionizable monomers m1 and the side-chain-bearing monomers m2 are preferably at least partly added at different times.

In a further preferred embodiment, in the polymerization, in a first step a), a portion of the ionizable monomers m1 is converted or polymerized and, after attainment of a predetermined conversion, in a second step b), the as yet unconverted ionizable monomers m1 are polymerized together with the side chain-bearing monomers m2. Step a) is especially effected essentially in the absence of side chain-bearing monomers m2.

In this way, in a simple and inexpensive manner, a copolymer having a section consisting essentially of polymerized ionizable monomers m1 followed by a section having gradient structure is preparable.

In accordance with a very particularly preferred embodiment, in the polymerization, in a first step a), a portion of the side chain-bearing monomers m2 is converted or polymerized and, after attainment of a predetermined conversion, in a second step b), the as yet unconverted side chain-bearing monomers m2 are polymerized together with the ionizable monomers m1. Step a) is especially effected essentially in the absence of ionizable monomers m1.

In this way, for example, in a simple and inexpensive manner, a copolymer having a section consisting essentially of polymerized side chain-bearing monomers m2 followed by a section having gradient structure is preparable.

It is advantageous here to conduct steps a) and b) in immediate succession. In this way, it is possible to maintain the polymerization reaction in steps a) and b) to the best possible degree.

The polymerization in step a) is especially conducted until 0.1-100 mol %, especially 1-95 mol %, preferably 10-90 mol %, in particular 25-85 mol %, of the ionizable monomers m1 or of the side chain-bearing monomers m2 have been converted or polymerized.

The conversion of the monomers m1 and m2 or the progress of the polymerization can be monitored in a manner known per se, for example, with the aid of liquid chromatography, especially high-performance liquid chromatography (HPLC).

More particularly, the copolymer consists to an extent of at least 50 mol %, in particular at least 75 mol %, especially at least 90 mol % or 95 mol %, of ionizable monomers m1 and side chain-bearing monomers m2.

The copolymer may be prepared in liquid or solid form. More preferably, the copolymer is present as a constituent of a solution or dispersion, wherein a proportion of the copolymer is especially 10-90% by weight, preferably 25-65% by weight. This means that the copolymer can be added, for example, very efficiently to binder compositions. If the copolymer is being prepared in solution, especially in aqueous solution, it is additionally possible to dispense with further processing.

In accordance with another advantageous embodiment, a copolymer is prepared in the solid state of matter, especially in the form of a powder, in the form of pellets and/or sheets. This especially simplifies the transport of the copolymers. Solutions or dispersions of the copolymers can be converted to the solid state of matter, for example, by spray-drying.

According to the reaction regime, it is possible by the process of the invention to prepare polymers having a given or well-defined structure in a controlled manner. More particularly, for example, copolymers with statistical (=random) monomer distribution, copolymers with block structure and/or copolymers with gradient structure are obtainable.

The copolymer is in particular a polymer having essentially linear structure. What is meant by that is in particular that all monomer units of the copolymer are arranged in a single and/or unbranched polymer chain. Specifically, the copolymer does not have a star-shaped structure and/or the copolymer is not part of a branched polymer. More particularly, the copolymer is not part of a polymer in which multiple, especially three or more, polymer chains running in different directions are attached to a central molecule.

Copolymers with Statistical Monomer Distribution

For example, it is possible to polymerize the ionizable monomers m1 and the side chain-bearing monomers m2 in such a way that a statistical or random monomer distribution is formed in the copolymer.

For the preparation of a copolymer with statistical monomer distribution, preference is given to preparing a mixture of ionizable monomers m1 and side chain-bearing monomers m2, and reacting them together via the nitroxide-mediated solution polymerization of the invention to give the copolymer.

The reaction can be stopped, for example, when the conversion of the monomers is 90 mol %.

Copolymers with Block Structure

In another advantageous embodiment, the ionizable monomers m1 and the side chain-bearing monomers m2 are converted to a copolymer having block structure, wherein the side chain-bearing monomers m2 are incorporated essentially into at least one first block A and ionizable monomers m1 essentially into at least one second block B.

In this case, any proportion of monomers m1 present in the first block A is advantageously less than 25 mol %, especially not more than 10 mol %, based on all the monomers m2 in the first block A. In addition, any proportion of monomers m2 present in the second block B is advantageously less than 25 mol %, especially not more than 10 mol %, based on all the monomers m1 in the second block B.

The following procedure has been found to be particularly preferable for preparation of copolymers comprising a block structure: in a first step a), at least a portion of the side chain-bearing monomers m2 is reacted or polymerized and, on attainment of a particular conversion, in a second step b), the ionizable monomers m1 are polymerized, optionally together with any as yet unconverted side chain-bearing monomers m2. Step a) is in particular effected essentially in the absence of ionizable monomers m1.

The polymerization in step a) is especially conducted until 75-95 mol %, preferably 85-95 mol %, especially 86-92 mol %, of the originally charged monomers m2 have been converted/polymerized.

More particularly, the polymerization in step b) is especially conducted until 75-95 mol %, especially 80-92 mol %, of the originally charged monomers m1 have been converted/polymerized.

The sequence of steps a) and b) may, however, in principle also be switched.

As has been found, it is advantageous to convert the monomers m1 and m2 in steps a) and b) up to the aforementioned conversions. In addition, it is advantageous to conduct steps a) and b) in immediate succession, irrespective of the sequence chosen. In this way, it is possible to maintain the polymerization reaction in steps a) and b) to the best possible degree.

The process can be conducted, for example, by, in step a), initially charging monomers m2 in a solvent, for example water, and then polymerizing them to give a first block A. As soon as the desired conversion of monomer m2 has been attained (e.g. 75-95 mol %, especially 80-92 mol %; see above), without a time delay, in step b), monomers m1 are added and the polymerization is continued. The monomers m1 here are especially added onto the A block already formed, which forms a second block B. The polymerization is advantageously again continued until the desired conversion of monomer m1 (e.g. 75-95 mol %, especially 80-92 mol %; see above) has been attained. This affords, for example, a diblock copolymer comprising a first block A and a second block B connected thereto.

Alternatively, it is possible in principle first to convert the ionizable monomers m1 in the first step, and only in the second step b) to convert the side chain-bearing monomers m2 in an analogous manner.

The monomers m2 and any further monomers in the first block A of the copolymer are especially in statistical or random distribution. The monomers m1 and any further monomers in the second block B of the copolymer are likewise especially in statistical or random distribution.

In other words, the at least one block A and/or the at least one block B preferably each take the form of a component polymer with random monomer distribution.

The at least one first block A advantageously comprises 5-70, especially 7-40, preferably 10-25, monomers m2 and/or the at least one further block B comprises 5-70, especially 7-50, preferably 20-40, monomers m1.

Preferably, any proportion of monomers m1 present in the first block A is less than 15 mol %, particularly less than 10 mol %, especially less than 5 mol % or less than 1 mol %, based on all the monomers m2 in the first block A. In addition, any proportion of monomers m2 present in the second block B is advantageously less than 15 mol %, particularly less than 10 mol %, especially less than 5 mol % or less than 1 mol %, based on all the monomers m1 in the second block B. Advantageously, both conditions are fulfilled at the same time.

Thus, the monomers m1 and m2 are essentially spatially separate, which is to the benefit of the dispersing effect of the copolymer and is advantageous with regard to the retardation problem.

The first block A, based on all the monomers in the first block A, consists in particular to an extent of at least 20 mol %, particularly at least 50 mol %, especially at least 75 mol % or at least 90 mol %, of monomers m2 of the formula II. The second block B, based on all the monomers in the second block B, consists advantageously to an extent of at least 20 mol %, particularly at least 50 mol %, especially at least 75 mol % or at least 90 mol %, of monomers m1 of the formula I.

In a further advantageous embodiment, in step a) and/or in step b), there is at least one further polymerizable monomer ms. The at least one further polymerizable monomer ms in this case is especially polymerized together with the at least one monomer m1 and/or the monomer m2.

Alternatively, it is possible, in addition to step a) and step b), to provide a further step c) for polymerization of the at least one further polymerizable monomer ms. In this way, it is possible to prepare a copolymer having an additional block C. More particularly, step c) is conducted between step a) and step b) in time. Thus, the additional block C may be arranged between the A and B blocks in space.

If present in the first block A, the at least one further monomer ms advantageously has a proportion in the first block A of 0.001-80 mol %, preferably 20-75 mol %, especially 30-70 mol %, based on all the monomers in the first block A.

If present in the second block B, the at least one further monomer ms advantageously has a proportion in the second block B of 0.001-80 mol %, preferably 20-75 mol %, especially 30-70 mol % or 50-70 mol %, based on all the monomers in the second block B.

In an advantageous embodiment, the at least one further monomer ms is present in the first block A and/or in the second block B with a proportion of 20-75 mol %, especially 30-70 mol %, based on all the monomers in the respective block.

A particularly advantageous copolymer with block structure has at least one or more than one of the following features:
   (i) Block A has 7-40, especially 10-25, monomers m2 and block B has 7-50, especially 20-40, monomers m1.
   (ii) The first block A, based on all the monomers in the first block A, consists to an extent of at 75 mol %, preferably at least 90 mol %, of monomers m2 of the formula II;
   (iii) The second block B, based on all the monomers in the second block B, consists to an extent of at 75 mol %, preferably at least 90 mol %, of monomers m1 of the formula I;
   (iv) A molar ratio of the monomers m1 to the monomers m2 in the copolymer is in the range of 0.5-6, preferably 0.8-3.5;
   (v) $R^1$ is COOM;

(vi) $R^2$ and $R^5$ are H or $CH_3$, preferably $CH_3$;
(vii) $R^3=R^4=R^6=H$;
(viii) m=0 and p=1;
(ix) X=—O—
(x) $A=C_2$-alkylene and n=10-150, preferably 15-50;
(xi) $R^a$=H or —$CH_3$, preferably $CH_3$.

Especially preferred is a diblock copolymer consisting of blocks A and B which has all the features (i)-(iv). Further preferred is a diblock copolymer having all the features (i)-(xi). Even further preferred is a diblock copolymer having all the features (i)-(xi) in the executions preferred in each case.

Likewise advantageous is a triblock copolymer consisting of the blocks A, B and C, especially in the sequence A-C—B, where the triblock copolymer has at least all the features (i)-(iv). Further preferred is a triblock copolymer having all the features (i)-(xi). Even further preferred is a triblock copolymer having all the features (i)-(xi) in the executions preferred in each case. Block C advantageously comprises monomers ms as described above, or block C consists thereof.

In a specific embodiment, these diblock copolymers or triblock copolymers also include, in block A and B, additionally a further monomer ms as described above.

Copolymers with Gradient Structure

In accordance with a further advantageous embodiment, the ionizable monomers m1 and the side chain-bearing monomers m2 are polymerized together at least in one section of the copolymer to form a concentration gradient and/or a gradient structure.

The term "gradient structure" or "concentration gradient" in the present case is especially a continuous change in the local concentration of a monomer in at least one section in a direction along the copolymer backbone. Another term for "concentration gradient" is "concentration slope".

The concentration gradient may, for example, be essentially constant. This corresponds to a linear decrease or increase in the local concentration of the respective monomer in the at least one section in the direction of the copolymer backbone. However, it is possible that the concentration gradient changes in the direction of the copolymer backbone. In this case, there is a nonlinear decrease or increase in the local concentration of the respective monomers. The concentration gradient extends especially over at least 10, especially at least 14, preferably at least 20 or at least 40, monomers of the copolymer.

By contrast, abrupt or sharp changes in concentration of monomers as occur, for example, in the case of block copolymers are not referred to as a concentration gradient.

The expression "local concentration" in the present context refers to the concentration of a particular monomer at a given point in the polymer backbone. In practice, the local concentration or the mean of the local concentration can be ascertained, for example, by determining the monomer conversions during the preparation of the copolymer. In this case, the monomers converted within a particular period can be ascertained. The averaged local concentration especially corresponds to the ratio of the mole fraction of a particular monomer converted within the period of time in question to the total molar amount of the monomers converted within the period of time in question.

The conversions of the monomers can be determined in a manner known per se, for example, with the aid of liquid chromatography, especially high-performance liquid chromatography (HPLC), and taking account of the amounts of monomers used.

The copolymer prepared may also have more than one section having a gradient structure, especially two, three, four or even more sections, which are arranged in succession, for example. If present, different gradient structures or concentration slopes may each be present in the different sections.

Preferably, in the at least one section with a gradient structure, a local concentration of the at least one ionizable monomer m1 increases continuously along the polymer backbone, while a local concentration of the at least one side chain-bearing monomer m2 decreases continuously along the polymer backbone, or vice versa.

A local concentration of the ionizable monomer m1 at the first end of the at least one section with the gradient structure is especially lower than at the second end of the section with gradient structure, while a local concentration of the side chain-bearing monomer m2 at the first end of the section with gradient structure is greater than at the second end of the section with gradient structure, or vice versa.

More particularly, in the case of a division of the at least one section with gradient structure into 10 subsections of equal length, the averaged local concentration of the at least one ionizable monomer m1 in the respective subsections along the polymer backbone increases in at least 3, especially in at least 5 or 8, successive subsections, while the averaged local concentration of the at least one side chain-bearing monomer m2 in the respective subsections along the polymer backbone decreases in at least 3, especially in at least 5 or 8, successive subsections, or vice versa.

Specifically, an increase or decrease in the averaged local concentration of the at least one ionizable monomer m1 in the successive subsections is essentially constant, while, advantageously, a decrease or increase in the averaged local concentration of the at least one side chain-bearing monomer m2 in the successive subsections is essentially likewise constant.

The following procedure has been found to be particularly preferable for preparation of copolymers comprising a gradient structure: in a first step a), at least a portion of the side chain-bearing monomers m2 is reacted or polymerized and, on attainment of a particular conversion, in a second step b), the ionizable monomers m1 are polymerized together with as yet unconverted side chain-bearing monomers m2. Step a) is in particular effected essentially in the absence of ionizable monomers m1.

It is also possible, in a first step a), to react or polymerize at least a portion of the ionizable monomers m1 and, on attainment of a particular conversion, in a second step b), to polymerize the side chain-bearing monomers m2 together with any as yet unconverted ionizable monomers m1. Step a) is in particular effected essentially in the absence of ionizable monomers m2.

More particularly, by the former process, it is possible in an efficient and inexpensive manner to prepare copolymers having a section consisting essentially of polymerized side chain-bearing monomers m2 followed by a section with gradient structure.

The polymerization in step a) is especially conducted until 1-74 mol %, preferably 10-70 mol %, in particular 25-70 mol %, especially 28-50 mol % or 30-45 mol %, of the side chain-bearing monomers m2 or of the ionizable monomers m1 have been converted or polymerized.

In a further advantageous embodiment, in step a) and/or in step b), there is at least one further polymerizable monomer ms of the formula III. The at least one further polymerizable monomer ms in this case is especially polymerized together with the at least one monomer m1 and/or the monomer m2.

In an advantageous embodiment, the at least one section with the gradient structure, based on a total length of the polymer backbone, has a length of at least 30%, especially at least 50%, preferably at least 75% or 90%.

Advantageously, the at least one section with the gradient structure, based on a total number of monomers in the polymer backbone, has a proportion of at least 30%, especially at least 50%, preferably at least 75% or 90%, of monomers.

In particular, the at least one section with gradient structure, based on the weight-average molecular weight of the overall copolymer, orders a proportion by weight of at least 30%, especially at least 50%, preferably at least 75% or 90%.

Thus, the section with gradient structure with the concentration gradient or the gradient structure is of particular importance.

The at least one section having gradient structure advantageously comprises at least 5, especially at least 7, preferably at least 10, monomer units m1 and/or at least 5, especially at least 7, preferably at least 10, monomer units m2.

The at least one section having gradient structure advantageously comprises at least 5, especially at least 7, preferably at least 10, monomer units m1 and at least 5, especially at least 7, preferably at least 10, monomer units m2.

The at least one section with gradient structure advantageously comprises 5-70, especially 7-40, preferably 10-25, monomers m1 and 5-70, especially 7-40, preferably 10-25 monomers m2.

It is advantageous when at least 30 mol %, especially at least 50 mol %, preferably at least 75 mol %, in particular at least 90 mol % or at least 95 mol %, of the ionizable monomers m1 are in the at least one section having a gradient structure.

Likewise advantageously, at least 30 mol %, especially at least 50 mol %, preferably at least 75 mol %, in particular at least 90 mol % or at least 95 mol %, of the side chain-bearing monomers m2 are in the at least one section having a gradient structure.

Especially preferably, the two latter aforementioned conditions apply simultaneously.

In another advantageous embodiment, the copolymer, in addition to the at least one section having a gradient structure, has a further section, wherein there is essentially a constant local concentration of the monomers and/or a statistical or random distribution of the monomers over the entire section. This section may consist, for example, of a single kind of monomers or of multiple different monomers in random distribution. In this section, however, there is especially no gradient structure and no concentration gradient along the polymer backbone.

The copolymer may also have more than one further section, for example two, three, four or even more sections, which differ from one another from a chemical and/or structural point of view.

Preferably, the section with the gradient structure directly adjoins the further section with the statistical monomer distribution.

It has been found that, surprisingly, copolymers of this kind are even more advantageous under some circumstances with regard to the plasticizing effect and the maintenance thereof over time.

More particularly, the further section with the statistical distribution comprises ionizable monomers m1 and/or side chain-bearing monomers m2.

Based on all the monomers present therein, the further section with the statistical monomer distribution, in one embodiment of the invention, for example, comprises advantageously at least 30 mol %, especially at least 50 mol %, preferably at least 75 mol %, in particular at least 90 mol % or at least 95 mol %, of ionizable monomers m1. Any proportion of side chain-bearing monomers m2 present in the further section with statistical monomer distribution is particularly less than 25 mol %, especially less than 10 mol % or less than 5 mol %, based on all monomers m1 in the further section. More particularly, there are no side chain-bearing monomer units m2 in the further section with statistical monomer distribution.

In a further and particularly advantageous implementation of the invention, the further section with statistical monomer distribution, based on all the monomers present therein, comprises at least 30 mol %, especially at least 50 mol %, preferably at least 75 mol %, in particular at least 90 mol % or at least 95 mol %, of side chain-bearing monomers m2. In this case, any proportion of ionizable monomers m1 present in the further section is in particular less than 25 mol %, especially less than 10 mol % or less than 5 mol %, based on all monomers m2 in the further section with statistical monomer distribution. More particularly, there are no ionizable monomers m1 in the further section with statistical monomer distribution.

It has been found to be appropriate when the further section comprises a total of 5-70, especially 7-40, preferably 10-25, monomers. These are especially monomers m1 and/or monomers m2.

A ratio of the number of monomer units in the at least one section with gradient structure to the number of monomers in the at least one further section with statistical monomer distribution is advantageously in the range of 99:1-1:99, especially 10:90-90:10, preferably 80:20-20:80, especially 70:30-30:70.

A particularly advantageous copolymer with gradient structure has at least one or more than one of the following features:
(i) The copolymer consists to an extent of at least 75 mol %, especially at least 90 mol % or 95 mol %, of ionizable monomers m1 and side chain-bearing monomers m2;
(ii) The copolymer comprises or consists of the at least one section with gradient structure and a further section with statistical monomer distribution;
(iii) The further section with statistical monomer distribution comprises side chain-bearing monomers m2, especially at least 50 mol %, preferably at least 75 mol %, in particular at least 90 mol % or at least 95 mol %, based on all the monomer units present in the further section with statistical monomer distribution. Any proportion of ionizable monomers m1 present in the further section is less than 25 mol %, especially less than 10 mol % or less than 5 mol %, based on all monomers m2 in the further section with statistical monomer distribution.
(iv) A molar ratio of the monomers m1 to the monomers m2 in the copolymer is in the range of 0.5-6, preferably 0.8-3.5;
(v) $R^1$ is COOM;
(vi) $R^2$ and $R^5$ are H or $CH_3$, preferably $CH_3$;
(vii) $R^3=R^4=R^6=R^7=H$;
(viii) m=0 and p=1;
(ix) X=—O—
(x) A=$C_2$-alkylene and n=10-150, preferably 15-50;
(xi) $R^a$=H or —$CH_3$, preferably $CH_3$.

Especially preferred is a copolymer consisting of a section with gradient structure and a section with statistical monomer distribution, which has at least all the features (i)-(iv). Further preferred is a copolymer having all the features (i)-(xi). Even further preferred is a copolymer having all the features (i)-(xi) in the executions preferred in each case.

Use of the Copolymers

The present invention further relates to the use of a copolymer as described above as dispersant for solid particles.

The term "solid particles" means particles composed of inorganic and organic materials. In particular, these are inorganic and/or mineral particles.

Particularly advantageously, the copolymer is used as dispersant for mineral binder compositions. The copolymer can especially be used for plasticization, for water reduction and/or for improvement of the workability of a mineral binder composition.

More particularly, the copolymer can be used for extending the workability of a mineral binder composition.

The present invention further additionally relates to a mineral binder composition comprising at least one copolymer as described above.

The mineral binder composition comprises at least one mineral binder. The expression "mineral binder" is especially understood to mean a binder which reacts in the presence of water in a hydration reaction to give solid hydrates or hydrate phases. This may, for example, be a hydraulic binder (e.g. cement or hydraulic lime), a latently hydraulic binder (e.g. slag), a pozzolanic binder (e.g. fly ash) or a nonhydraulic binder (gypsum or white lime).

More particularly, the mineral binder or the binder composition comprises a hydraulic binder, preferably cement. Particular preference is given to a cement having a cement clinker content of 35% by weight. More particularly, the cement is of the CEM I, CEM II, CEM III, CEM IV or CEM V type (according to standard EN 197-1). A proportion of the hydraulic binder in the overall mineral binder is advantageously at least 5% by weight, especially at least 20% by weight, preferably at least 35% by weight, especially at least 65% by weight. In a further advantageous embodiment, the mineral binder consists to an extent of 95% by weight of hydraulic binder, especially of cement or cement clinker.

Alternatively, it may be advantageous when the mineral binder or the mineral binder composition comprises or consists of other binders. These are especially latently hydraulic binders and/or pozzolanic binders. Suitable latently hydraulic and/or pozzolanic binders are, for example, slag, fly ash and/or silica dust. The binder composition may likewise comprise inert substances, for example limestone, quartz flours and/or pigments. In an advantageous embodiment, the mineral binder contains 5-95% by weight, especially 5-65% by weight, more preferably 15-35% by weight, of latently hydraulic and/or pozzolanic binders. Advantageous latently hydraulic and/or pozzolanic binders are, for example, slag and/or fly ash.

In a particularly preferred embodiment, the mineral binder comprises a hydraulic binder, especially cement or cement clinker, and a latently hydraulic and/or pozzolanic binder, preferably slag and/or fly ash. The proportion of the latently hydraulic and/or pozzolanic binder in this case is more preferably 5-65% by weight, more preferably 15-35% by weight, while at least 35% by weight, especially at least 65% by weight, of the hydraulic binder is present.

The mineral binder composition is preferably a mortar or concrete composition.

The mineral binder composition is especially a workable mineral binder composition and/or one which is mixed with water.

A weight ratio of water to binder in the mineral binder composition is preferably in the range of 0.25-0.7, particularly 0.26-0.65, preferably 0.27-0.60, especially 0.28-0.55.

The copolymer is advantageously used with a proportion of 0.01-10% by weight, especially 0.1-7% by weight or 0.2-5% by weight, based on the binder content. The proportion of the copolymer is based on the copolymer per se. In the case of a copolymer in the form of a solution, it is the solids content that is correspondingly crucial.

An additional aspect of the present invention relates to a shaped body, especially a constituent of a built structure, obtainable by curing a mineral binder composition comprising a copolymer as described above after addition of water. A built structure may, for example, be a bridge, a building, a tunnel, a roadway or a runway.

Further advantageous embodiments will be apparent from the working examples which follow.

WORKING EXAMPLES

1. Preparation Examples for Polymers 1.1 Statistical Polymer R1

For comparative purposes, a polymer R1 having statistical or random monomer distribution was prepared. Polymer R1 was prepared by polymer-analogous esterification (PAE). The procedure was essentially as described in EP 1 138 697 B1 at page 7 line 20 to page 8 line 50, and in the examples cited therein. Specifically, a polymethacrylic acid was esterified with methoxy polyethylene glycol$_{1000}$ (singly methoxy-terminated polyethylene glycol having an average molecular weight of 1'000 g/mol; ~20 ethylene oxide units/molecule), so as to result in a molar ratio of methacrylic acid units to ester groups of 2 (m1/m2=2). The solids content of the polymer R1 is around 40% by weight.

1.2 Diblock Copolymer P1

For preparation of a diblock copolymer P1 by means of nitroxide-mediated solution polymerization, a round-bottom flask equipped with a reflux condenser, stirrer system, thermometer and an inert gas inlet tube was initially charged with 11.6 g of 50% methoxy polyethylene glycol$_{1000}$ methacrylate (average molecular weight: 1'000 g/mol; ~20 ethylene oxide units/molecule), 53.2 mg of styrene and 5 g of deionized water. The reaction mixture was heated to 90° C. with vigorous stirring. A gentle inert gas stream (N$_2$) was passed through the solution during the heating and over all the remaining reaction time.

Thereafter, a solution of 10 g of 0.1 N sodium hydrogencarbonate and 85 mg of "BlocBuilder MA" (agent; CAS No.: 654636-62-1; available from Arkema, France) was added. Then the conversion of the methoxy polyethylene glycol$_{1000}$ methacrylate was monitored by means of HPLC. As soon as this exceeded 85%, 1.0 g of methacrylic acid was added. As soon as the conversion of methacrylic acid exceeded 80%, the reaction was stopped.

The molar ratio of methacrylic acid units to methoxy polyethylene glycol methacrylate was 2 (m1/m2=2) and the solids content of polymer P1 was about 40% by weight.

1.3 Statistical Polymer P2

A second polymer R1 having statistical or random monomer distribution was prepared. The procedure was analogous to the preparation of polymer P1 (previous chapter), except that the methacrylic acid was included in the initial charge at the start together with the methoxy polyethylene glycol-1000 methacrylate. The solids content of the polymer P1 was again around 40% by weight.

1.4 Statistical Polymer P3

A third polymer P3 having statistical or random monomer distribution was prepared. The procedure was analogous to the preparation of polymer P2 (chapter 1.3), using a mixture of methacrylic acid, methoxy polyethylene glycol$_{1000}$ methacrylate and 2-hydroxyethyl acrylate (HEA, as further monomer ms) at a temperature of 80° C. as the initial charge. The solution polymerization was then effected at a pH of 8. This was established via the amount of base added in the solution containing BlocBuilder MA. The conversion of the monomers increased in an essentially linear manner over a period of about 50 minutes. Correspondingly, the reaction can be efficiently controlled.

The molar ratio of methacrylic acid units:methoxy polyethylene glycol methacrylate:2-hydroxyethyl acrylate was 4:2:1 and the solids content of polymer P3 was about 40% by weight. The polymers P3 were additionally found to be stable. More particularly, during and after the preparation of the polymers, no significant hydrolysis of the acrylate or methacrylate monomers was detectable in the HPLC measurements.

1.5 Statistical Polymer P4

A fourth polymer P4 having statistical or random monomer distribution was prepared. The procedure was analogous to the preparation of polymer P3 (chapter 1.4) (temperature likewise 80° C.), except that a pH of 4 was set rather than the pH of 8 by dispensing with the addition of a base. In this case, by contrast with the preparation of polymer P3 what was obtained at first was not a solution but a heterogeneous reaction mixture. As checked on the basis of HPLC measurements, the conversion of the monomers rose very rapidly in the preparation of polymer P4. After about 10 minutes all monomers had already been converted.

Although it is possible in this way to prepare polymers, controlled preparation of polymers is difficult in practice. The polymers P4 were therefore not given further consideration.

1.6 Statistical Polymer P5

A fifth polymer P5 having statistical or random monomer distribution was again prepared in the manner of polymer P3 (chapter 1.4) (temperature likewise 80° C.). However, rather than the pH of 8, a pH of 11 was established (via the amount of base added). HPLC measurements showed that, under these conditions, a portion of the acrylate/methacrylate monomers is already hydrolyzed during the polymerization and thereafter. This means that methoxy polyethylene glycol groups or hydroxyethyl groups are eliminated, and these can no longer be/are no longer bound to the polymer. However, the conversion of the monomers, as in the case of polymer P3, increased in an essentially linear manner over a period of about 50 minutes. Correspondingly, good control of the reaction is possible under these conditions as well.

The molar ratio of methacrylic acid units:methoxy polyethylene glycol methacrylate:2-hydroxyethyl acrylate was 4:2:1 and the solids content of polymer P5 was about 40% by weight.

2. Polydispersity

The polydispersity of the polymers of the invention is about 1.2 across the board. By contrast, the comparative polymer R1 prepared by polymer-analogous esterification has a polydispersity of about 1.5.

3. Mortar Tests

To determine the dispersancy of the polymers, the slump of a series of cement pastes mixed with water was measured at different times according to EN 1015-3. The mortars were produced using cement (CEM I type), and water (w/c=0.31).

It was found here that the copolymers of the invention have a good and long-lasting plasticizing effect.

A comparison of polymers P3 and P5 shows the following: with polymer P3 in cement pastes, a slump immediately after mixing of 160 mm is measured, while polymer P5 gives a slump of 80 mm. This shows that particularly preferred polymers are obtained especially by a solution polymerization at a pH of about 8.

However, the above-described embodiments should be regarded merely as illustrative examples which can be modified as desired within the scope of the invention.

The invention claimed is:

1. A process for preparing a copolymer, comprising polymerizing ionizable monomers m1 and side chain-bearing monomers m2 by nitroxide-mediated solution polymerization to give the copolymer, wherein the polymerization is conducted in the presence of an agent comprising a carboxyl-bearing phosphated alkoxy amine; wherein the nitroxide-mediated solution polymerization is conducted at a pH in the range of 7.5-13, and the monomers are converted to a copolymer having block structure, wherein the side chain-bearing monomers m2 are present in at least one first block A and ionizable monomers m1 are present in at least one second block B any proportion of monomers m1 present in the first block A is less than 15 mol % based on all the monomers m2 in the first block A, and any proportion of monomers m2 present in the second block B is less than 15 mol % based on all the monomers m1 in the second block B.

2. The process as claimed in claim 1, wherein the proportion of monomers m1 present in the first block A is less than 5 mol % based on all the monomers m2 in the first block A, and the proportion of monomers m2 present in the second block B is less than 5 mol % based on all the monomers m1 in the second block B.

3. The process as claimed in claim 1, wherein the proportion of monomers m1 present in the first block A is less than 1 mol % based on all the monomers m2 in the first block A, and the proportion of monomers m2 present in the second block B is less than 1 mol % based on all the monomers m1 in the second block B.

4. The process as claimed in claim 1, wherein a molar ratio of the ionizable monomers m1 used to the side chain-bearing monomers m2 used is in the range of 0.5-6.

5. The process as claimed in claim 1, wherein the solution polymerization is effected in a polar solvent.

6. The process as claimed in at claim 1, wherein the nitroxide-mediated solution polymerization is conducted at a temperature of 40-120° C.

7. The process as claimed in claim 1, wherein the nitroxide-mediated solution polymerization is effected in the presence of a base.

8. The process as claimed in claim 1, wherein the nitroxide-mediated solution polymerization is conducted at a pH in the range of 7.5-10.

9. The process as claimed in claim 1, wherein the nitroxide-mediated solution polymerization is conducted at a pH in the range of 7.5-8.5.

10. The process as claimed in claim 1, wherein the agent has exactly one carboxyl group and exactly one nitroxide group.

11. The process as claimed in claim 1, wherein the agent is a compound of the formula X:

$$\text{(X)}$$

where
- $R^{11}$ is a linear or branched alkyl radical having 1-6 carbon atoms;
- $R^{12}$ and $R^{13}$ are each independently hydrogen or a linear or branched alkyl radical having 1-6 carbon atoms;
- $R^{14}$ and $R^{15}$ are each independently a linear or branched alkyl radical having 1-6 carbon atoms;
- $R^{16}$ and $R^{17}$ are each independently a linear or branched alkyl radical having 1-6 carbon atoms;
- T independently represents $H^+$, an alkali metal ion, an alkaline earth metal ion, a di- or trivalent metal ion, an ammonium ion or an organic ammonium group.

12. The process as claimed in claim 1, wherein the ionizable monomers m1 have a structure of the formula I:

$$\text{(I)}$$

and the side chain-bearing monomers m2 have a structure of the formula II:

$$\text{(II)}$$

where
- $R^1$, in each case independently, is —COOM, —SO$_2$—OM, —O—PO(OM)$_2$ and/or —PO(OM)$_2$,
- $R^2$, $R^3$, $R^5$ and $R^6$, in each case independently, are H or an alkyl group having 1 to 5 carbon atoms,
- $R^4$ and $R^7$, in each case independently, are H, —COOM or an alkyl group having 1 to 5 carbon atoms, or where $R^1$ forms a ring together with $R^4$ to give —CO—O—CO—,
- M, independently of one another, represents $H^+$, an alkali metal ion, an alkaline earth metal ion, a di- or trivalent metal ion, an ammonium ion or an organic ammonium group;
- m=0, 1 or 2,
- p=0 or 1,
- X, in each case independently, is —O— or —NH—,
- $R^8$ is a group of the formula -[AO]$_n$—$R^a$
    where
    - A=C$_2$- to C$_4$-alkylene,
    - $R^a$ is H, a C$_1$- to C$_{20}$-alkyl group, -cycloalkyl group or -alkylaryl group, and
- n=2-250.

13. The process as claimed in claim 12, wherein $R^1$=COOM; $R^2$ and $R^5$, independently of one another, are H, —CH$_3$ or mixtures thereof; $R^3$ and $R^6$, independently of one another, are H or —CH$_3$; $R^4$ and $R^7$, independently of one another, are H or —COOM; and where X in at least 75 mol %, of all monomers m2 is —O—.

14. The process as claimed in claim 1, wherein at least one further monomer ms is present and is polymerized during the polymerization, wherein ms is optionally a monomer of the formula III:

$$\text{(III)}$$

where
- $R^{5'}$ and $R^{6'}$, in each case independently, are H or an alkyl group having 1 to 5 carbon atoms,
- $R^{7'}$ is H, —COOM or an alkyl group having 1 to 5 carbon atoms,
- m'=0, 1 or 2,
- p'=0 or 1;
- Y, in each case independently, is a chemical bond or —O—;
- Z, in each case independently, is a chemical bond, —O— or —NH—; and
- $R^9$, in each case independently, is an alkyl group, cycloalkyl group, alkylaryl group, aryl group, hydroxyalkyl group or acetoxyalkyl group, each having 1-20 carbon atoms.

* * * * *